P. JOINER.
COTTON CHOPPER.
APPLICATION FILED MAR. 9, 1909.
930,184.
Patented Aug. 3, 1909.
2 SHEETS—SHEET 2.
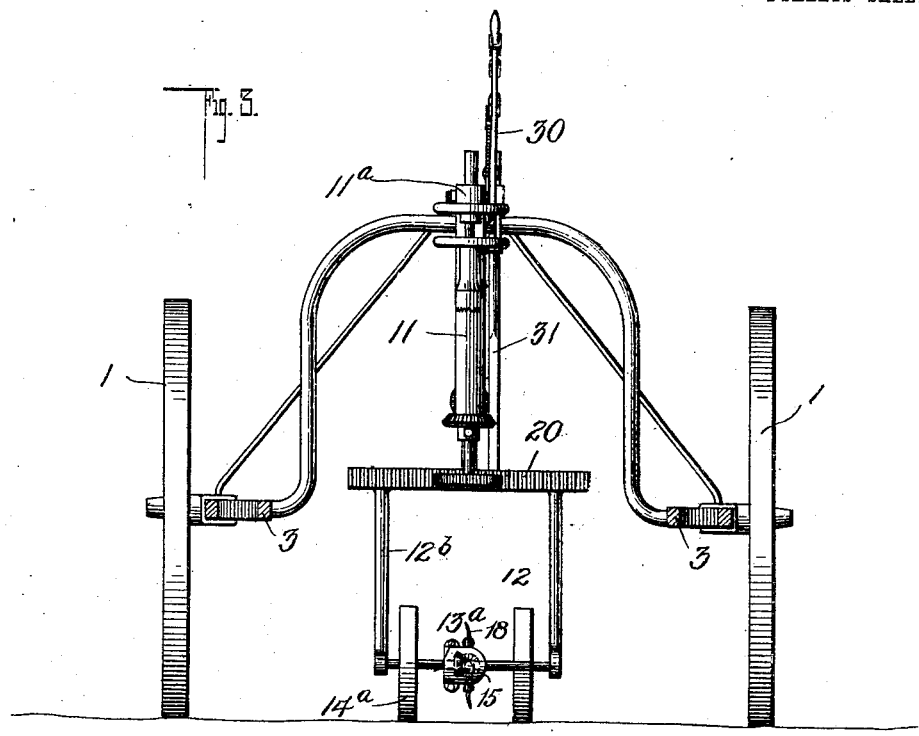
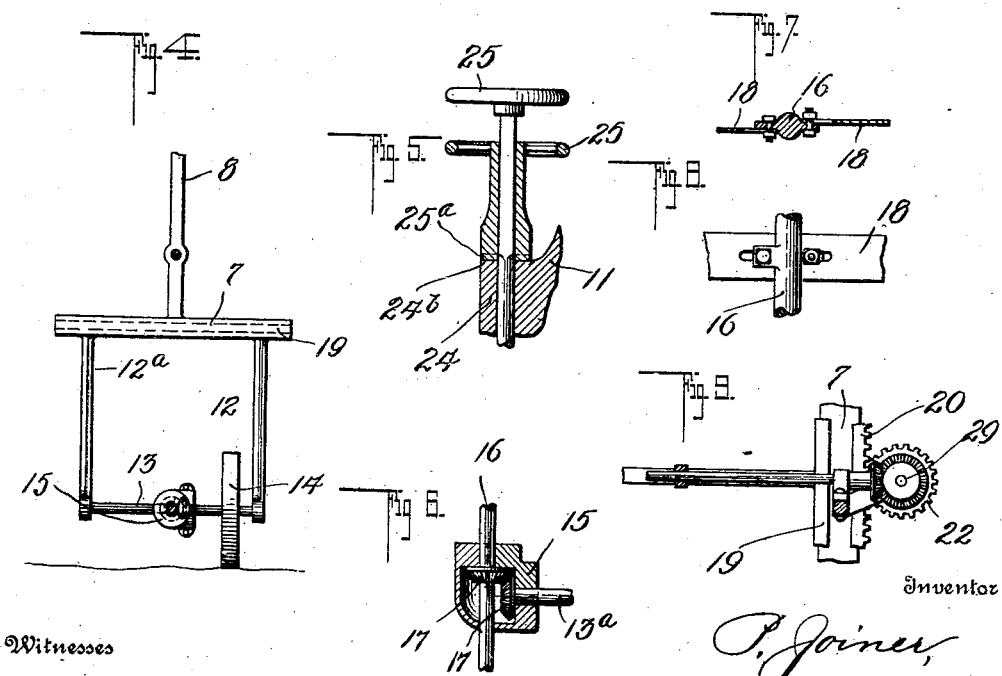

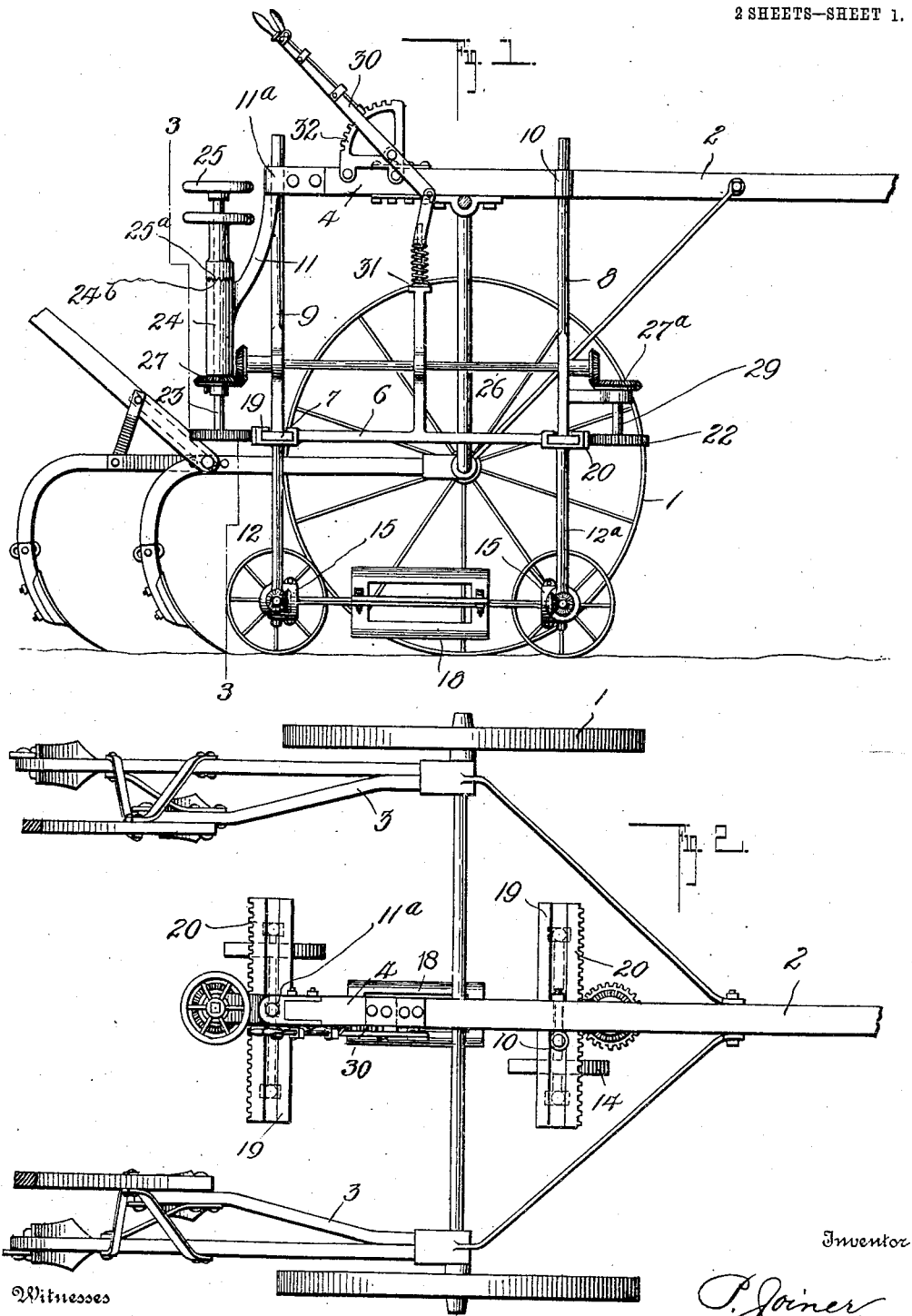

UNITED STATES PATENT OFFICE.

PRESTON JOINER, OF GREGORY, TEXAS.

COTTON-CHOPPER.

No. 930,184.     Specification of Letters Patent.     Patented Aug. 3, 1909.

Application filed March 9, 1909. Serial No. 482,365.

*To all whom it may concern:*

Be it known that I, PRESTON JOINER, a citizen of the United States, residing at Gregory, in the county of San Patricio and State of Texas, have invented certain new and useful Improvements in Cotton-Choppers, of which the following is a specification.

This invention relates to that class of agricultural machines commonly known as cotton choppers, and consists of an attachment particularly adapted to be secured to cultivators and for the customary purposes of this class of devices.

The invention resides particularly in the specific means employed to thin the cotton and the peculiar mounting of the several parts upon the cultivator whereby they may be readily placed in or out of action or operative position, special devices being employed to properly guide or direct the cutting mechanism as it travels along the rows of cotton.

For a full understanding of the invention, reference is to be had to the following detail description and to the accompanying drawings, in which—

Figure 1 is a side elevation showing the invention applied to an ordinary form of cultivator; Fig. 2 is a top plan view; Fig. 3 is a rear elevation; Fig. 4 is a view of the end portion of the wheel frame and supporting frame thereof; Fig. 5 is a fragmentary view partly in section of the operating mechanism for shifting the wheel frame laterally; Fig. 6 is a detail section of the gears connecting the hoe shaft with the driving axle; Fig. 7 is a detail sectional view of the hoe blades, and considerably exaggerated; Fig. 8 is a detail plan view of the parts shown in Fig. 7, and Fig. 9 is a fragmentary view showing the connections between the rack and pinion devices.

Throughout the following detail description and on the several figures of the drawings similar parts are referred to by like reference characters.

Referring to the drawings and specifically describing the features of the invention, the numeral 1 denotes the wheels of an ordinary cultivator, and the numeral 2 the usual tongue which is connected to the frame of the same, the numeral 3 denoting the usual beams which carry the shovels. In the practical embodiment of the invention it is contemplated that the attachment which comprises the cotton chopper shall be arranged between the beams 3 and suitably secured to the parts of the cultivator. To facilitate the attachment of the invention the tongue 2 of the cultivator is provided at its rear end with an extension 4 that is spliced to the body of the tongue by any suitable clamping means.

The cotton chopper proper comprises a supporting frame consisting of a longitudinal bar 6 at the opposite ends of which are arranged transverse end members 7. Uprights 8 and 9 project upwardly from the opposite ends of the bar 6 and the upright 8 passes through a guide sleeve 10 which is attached by any suitable means to the tongue 2 of the cultivator and just in advance of the spliced joint for the extension 4. The upright 9, however, is connected with the rear end portion of the extension 4 of the tongue, and by the means of an arm $11^a$ through which it passes, said arm forming a part of a suitable bracket 11 fastened rigidly to the rear extremity of the extension 4 aforesaid.

The provision of the parts 10 and 11 permits of vertical movement of the frame of the cotton chopper in an evident manner and in order to permit of raising and lowering a wheel frame 12 which is arranged just below the upper frame of the cotton chopper before described. The wheeled frame 12 comprises a front U-shaped portion $12^a$ in the lower part of which is journaled an axle 13 on which the front wheel 14 is mounted. In like manner a rear U-shaped portion $12^b$ of the frame 12 supports an axle $13^a$ which is adapted to be rotated by a ground wheel $14^a$. Couplings 15 at the lower inner portion of the frame members $12^a$ and $12^b$ connect the said frame members with the hoe shaft 16 which supports the hoe or cutting blades by which the cotton is thinned as the machine is advanced over the field. The shaft 16 has pinions 17 on its opposite ends and which pinions mesh with pinions carried by the adjacent ends of the axles 13 and $13^a$, said axle by means of the wheels 14 and $14^a$ being adapted to rotate the shaft 16 together with the hoe blades which are indicated at 18. The cutting hoe preferably comprises about four blades and these blades curve laterally slightly at their outermost portions. Each blade of the hoe is of somewhat U-form and its legs or side portions are slotted so as to permit of ready adjustment of the blades in regard to their connection with the shaft 16, whereby the machine may be adjusted so as to cut either deep or shallow according as may be desired.

The upper portions of the frame members 12ᵃ and 12ᵇ are formed with flanges adapted to engage over the end bars or pieces 7 of the upper frame bars 6, and the said flanges indicated at 19 are adapted to permit of lateral sliding movement of the members 12ᵃ and 12ᵇ upon the end pieces 7 and in order that the operator may guide the cutting devices in accordance with the direction in which the row of cotton extends, whether the row be straight or somewhat crooked. Racks 20 formed on the upper portion of the frame members 12ᵃ and 12ᵇ of the frame 12 are in mesh with gears 21 and 22, the gear 21 being carried by a vertical shaft 23 mounted in a bearing 24 of bracket 11 located and extending from the rear end of the section 4 of the tongue. The lower portion of the bracket 11, shown at 24, and which forms a bearing for the shaft 23, is of many sided form. The upper portion of the shaft 23 is squared and on this portion are mounted two hand wheels 25, the upper wheel being adapted to be grasped in order to turn the shaft 23 and cause lateral movement of the members 12ᵃ and 12ᵇ. The lower hand wheel 25 is formed with a toothed portion 25ᵃ adapted to receive teeth 24ᵇ at the upper portion of the bearing 24. When the teeth 24ᵇ and 25ᵇ are engaged it will be apparent that the shaft 23 is locked from rotation. However, when the operator wishes to adjust the position of the hoe blades by moving the frame members 12ᵃ and 12ᵇ laterally, it is only necessary to slightly elevate the lower hand wheel 25 and then by turning both of the wheels 25 the frame 12 may be moved in any desired manner. The shaft 23 has a gear 27 thereon which meshes with a gear on the end of a horizontal shaft 26 which is mounted in suitable bearings in the uprights 8 and 9 of the upper frame-work of the chopping mechanism. The shaft 26 has a gear on its front end which meshes with a gear 27ᵃ carried by a vertical shaft 29 located in advance of the upright 8 and corresponding to the shaft 23 but not having the operating mechanism of the latter. The shaft 29 carries the gear 22 before mentioned and in mesh with the rack 20 at the front portion of the frame 12. The object in providing the shaft 26 is to afford a means for simultaneously turning the gears 22 and 21 in order to properly move the frame 12 laterally and adjust its position to accord with the direction in which the operator wishes the hoe to cut in thinning the cotton plants.

Mounted on the spliced extension 4 of the tongue 2 is a lever 30 which is connected with a rod 31, the lower end of which is attached to the frame 12. The lever 13 is in convenient reach of the operator and by pushing downward upon the outer end of said lever it will be observed that the frame 12 may be elevated so that the wheels 14 and 14ᵃ are entirely off of the ground and the cotton chopping mechanism elevated to a position in which it will not be operative to thin the plants as the machine passes over the field. In other words, the lever 30, which is held in adjusted position by a suitable catch coöperating with a segment 32, is a suitable device for throwing the cotton chopping mechanism into and out of operation.

The invention possesses many advantageous features of construction and especially from the standpoint of simplicity and the general adaptability of the device for attachment to various kinds of machines ordinarily used on the farm, and not only on cultivators, in accordance with the foregoing description.

Having thus described the invention, what is claimed as new is:

1. In a cotton chopper of the class described, the combination of a supporting frame, a wheel-frame arranged below the supporting frame, axles carried by the wheel-frame, ground wheels mounted on said axles and adapted to turn the same, a hoe shaft connecting the axles together and intergeared therewith so as to be driven by the wheels mounted thereon, a hoe carried by the hoe-shaft, and means for moving the wheel-frame laterally for the purpose described.

2. In a cotton chopper of the class described, the combination of a supporting frame, a wheel-frame arranged below the supporting frame, axles carried by the wheel frame, ground wheels mounted on said axles and adapted to turn the same, a hoe shaft connecting the axles together and intergeared therewith so as to be driven by the wheels mounted thereon, a hoe carried by the hoe-shaft, the wheel-frame embodying front and rear racks, and operating mechanism including gears in mesh with the said racks and adapted to be simultaneously operated in order to move the wheel-frame laterally for the purpose specified.

3. In a cotton chopper, the combination of a supporting frame, means for raising and lowering said frame, a wheel-frame carried by the supporting frame and movable laterally with respect thereto, means for effecting lateral adjustment of the wheel-frame with respect to the supporting frame, a hoe shaft mounted on the wheel-frame, axles mounted on the wheel-frame and intergeared with the hoe shaft for operation thereof, and ground wheels carried by said axles for turning the same and thus rotating the hoe shaft, and a hoe mounted upon the hoe-shaft.

4. A cotton chopper comprising an attachment consisting of a supporting frame, means for raising and lowering said supporting frame connected therewith, a wheel frame mounted on the supporting frame and comprising front and rear frame-members having sliding connection with the front and rear portions of the supporting frame, racks carried by the front and rear members of the wheel-frame, a horizontal shaft mounted on the supporting frame, vertical shafts at the front and rear ends of the wheel frame, and having gears thereon connecting the said shaft with the horizontal shaft and with the racks aforesaid, means for turning one of the vertical shafts to move the wheel-frame laterally, and cutting mechanism on the wheel-frame.

In testimony whereof I affix my signature in presence of two witnesses.

PRESTON JOINER.

Witnesses:
BERT E. KINDER,
FLORENCE WATSON.